United States Patent
Heckmann et al.

(10) Patent No.: US 10,915,770 B2
(45) Date of Patent: Feb. 9, 2021

(54) METHOD FOR ASSISTING A DRIVER OF AN EGO-VEHICLE IN MAKING USE OF A GAP BETWEEN VEHICLES, CORRESPONDING DRIVER ASSISTANCE SYSTEM AND VEHICLE EQUIPPED WITH SUCH DRIVER ASSISTANCE SYSTEM

(71) Applicant: HONDA RESEARCH INSTITUTE EUROPE GMBH, Offenbach/Main (DE)

(72) Inventors: Martin Heckmann, Offenbach (DE); Dennis Orth, Mülheim an der Ruhr (DE); Dorothea Kolossa, Bochum (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 16/686,771

(22) Filed: Nov. 18, 2019

(65) Prior Publication Data
US 2020/0160077 A1    May 21, 2020

(30) Foreign Application Priority Data
Nov. 16, 2018   (EP) .................................. 18206695

(51) Int. Cl.
*G06K 9/00* (2006.01)
*B60W 30/095* (2012.01)
(Continued)

(52) U.S. Cl.
CPC ..... *G06K 9/00845* (2013.01); *B60W 30/0956* (2013.01); *B60W 30/18154* (2013.01);
(Continued)

(58) Field of Classification Search
CPC .......... G06K 9/00845; B60W 30/0956; B60W 30/18154; B60W 50/14; B60W 40/06;
(Continued)

(56) References Cited

U.S. PATENT DOCUMENTS

| | | | |
|---|---|---|---|
| 2004/0150514 A1* | 8/2004 | Newman ................ | G08G 1/166 340/435 |
| 2009/0088925 A1* | 4/2009 | Sugawara ............. | B60W 30/12 701/41 |

(Continued)

FOREIGN PATENT DOCUMENTS

| | | |
|---|---|---|
| DE | 10 2009 005 730 A1 | 7/2010 |
| EP | 2 620 314 A1 | 7/2013 |
| EP | 3 235 701 A1 | 10/2017 |

OTHER PUBLICATIONS

European Search Report dated May 31, 2019 corresponding to European Patent Application No. 18206695.1.

*Primary Examiner* — An T Nguyen
(74) *Attorney, Agent, or Firm* — Squire Patton Boggs (US) LLP

(57) ABSTRACT

A method for assisting a driver of an ego-vehicle in making use of a gap between vehicles to enter a traffic flow at an intersection is suggested, comprising the following method steps: First, other vehicles in the environment of the ego-vehicle are physically sensed using at least one environment sensor mounted on the ego-vehicle. Second, a gap size of at least one gap between two successive vehicles are calculated in a processor based on the sensor's/sensors' output. An ego-vehicle driver's gazing behavior using at least one driver sensor mounted on the ego-vehicle is observed and analyzed and an assistance signal is generated based on the result of the analysis and the determined size of the at least (Continued)

one gap. Finally, a recommendation or warning perceivable for the ego-vehicle's driver is output in accordance with the assistance signal.

9 Claims, 3 Drawing Sheets

(51) Int. Cl.
    *B60W 30/18*     (2012.01)
    *B60W 50/14*     (2020.01)
    *G08G 1/01*     (2006.01)

(52) U.S. Cl.
    CPC ........... *B60W 50/14* (2013.01); *G08G 1/0112* (2013.01); *G08G 1/0141* (2013.01); *G08G 1/0145* (2013.01)

(58) Field of Classification Search
    CPC .. G08G 1/0112; G08G 1/0141; G08G 1/0145; G08G 1/167; B60T 7/12; B62D 15/0255
    See application file for complete search history.

(56) References Cited

U.S. PATENT DOCUMENTS

| | | | | |
|---|---|---|---|---|
| 2011/0313665 | A1* | 12/2011 | Lueke | G01S 13/931 701/301 |
| 2014/0067250 | A1* | 3/2014 | Bone | G08G 1/167 701/301 |
| 2014/0074356 | A1* | 3/2014 | Bone | G08G 1/167 701/41 |
| 2015/0191176 | A1* | 7/2015 | Kobana | B60K 28/06 701/70 |
| 2016/0091897 | A1* | 3/2016 | Nilsson | B60W 30/16 701/25 |
| 2016/0203719 | A1* | 7/2016 | Divekar | B60R 1/00 701/70 |
| 2017/0113683 | A1* | 4/2017 | Mudalige | B60W 30/18145 |
| 2017/0120749 | A1* | 5/2017 | Dias | G08B 21/06 |
| 2017/0309173 | A1* | 10/2017 | Heckmann | B60W 50/14 |
| 2018/0005526 | A1* | 1/2018 | Sendhoff | G08G 1/09623 |
| 2018/0059670 | A1* | 3/2018 | Nilsson | B60W 30/0956 |
| 2018/0339708 | A1* | 11/2018 | Geller | B60W 50/0097 |
| 2019/0102689 | A1* | 4/2019 | Lassoued | G07C 5/0841 |
| 2019/0130753 | A1* | 5/2019 | Graham | G08G 1/161 |
| 2019/0135291 | A1* | 5/2019 | Sim | A61B 5/0077 |
| 2019/0232931 | A1* | 8/2019 | Heckmann | B60T 7/12 |
| 2019/0283756 | A1* | 9/2019 | Leonard | G05D 1/0255 |
| 2019/0375430 | A1* | 12/2019 | Emura | G08G 1/00 |
| 2020/0001879 | A1* | 1/2020 | Pietzsch | B60W 30/18 |
| 2020/0039535 | A1* | 2/2020 | Marberger | B60W 30/16 |
| 2020/0160077 | A1* | 5/2020 | Heckmann | G08G 1/0141 |

* cited by examiner

METHOD FOR ASSISTING A DRIVER OF AN EGO-VEHICLE IN MAKING USE OF A GAP BETWEEN VEHICLES, CORRESPONDING DRIVER ASSISTANCE SYSTEM AND VEHICLE EQUIPPED WITH SUCH DRIVER ASSISTANCE SYSTEM

BACKGROUND

Field

The invention regards a method for assisting a driver of an ego-vehicle in making use of a gap between vehicles to enter a traffic flow at an intersection. The invention also regards a corresponding driver assistance system and a vehicle with such driver assistance system being mounted thereon.

Description of the Related Art

Nowadays, many vehicles are equipped with driver assistance systems. Unfortunately, not every driver is willing to accept the recommendations of such driver assistance systems and some drivers even feel distracted. It is thus very important for increasing traffic safety that acceptance of driver assistance systems is improved, which will happen automatically when only recommendations are given that the driver of a vehicle considers to be helpful. One way to achieve such acceptance is that the driver is able to individualize the extent to which recommendations are given by driver assistance systems and that the given recommendations are perceived as being helpful. Of course, it is burdensome that the driver needs to input his preferences or needs to tailor the settings of the assistance system. In particular, if a large number of such assistance systems is available in, for example, a luxury car, this procedure is very time-consuming and might therefore even annoy the potential user. Furthermore, it needs a certain understanding of the functionality of the assistance systems, when a real improvement shall be achieved.

It can be observed that an increase of the burden to perform adjustments for the assistance system leads to reduced acceptance. Acceptance of the system however, is crucial for improving the safety in driving the vehicle. Thus, it was suggested in EP 3 235 701 A1 in the context of a left-turn assistant, which suggests fitting gaps in the traffic flow from the right for entering the intersection that, without the requirement of an input from a driver, the system will autonomously adjust its recommendation for a gap that might be used to enter a traffic flow based on an observation of the driver's behavior in the past. The system determines gaps and, in particular, gap sizes between successive vehicles in the traffic flow and stores those gap sizes, which the driver accepted. Thus, without the need for driver input, a minimum gap size is determined and only gaps are recommended to be used by the driver for entering into a traffic flow that are at least as large as the determined minimum gap size. Future recommendations therefore will recommend smaller gaps to a driver for whom it was determined that he regularly uses smaller gaps. Vice versa, the system will not recommend small gaps, when it observed from past behavior that the driver does not use such small gaps. The observation of the driver's behavior therefore allows to individualize the recommended gap size without bothering the driver.

One problem with this approach is that an adaptation of the minimum gap size requires several observations before adapting the determined minimum gap size. The system is only able to adapt the minimum gap size from observations in the past and thus learns based on a plurality of different states and situations in which the driver was when the observation was made. The state of the art approach is therefore not able to provide an immediate or instantaneous adaptation to an individual driver in every driving situation. Every driving situation is a little bit different and the driver's condition may also change. For example, the concentration of the driver varies to a large extent, which obviously has an effect on the gap size that safely might be entered by the ego-vehicle driver.

SUMMARY

It is thus an object of the present invention to provide an improved method for assisting a driver of an ego-vehicle in making use of a gap between vehicles to enter a traffic flow at an intersection, to provide the respective driver assistance system and corresponding vehicle equipped with it.

The object is achieved by the method, system and vehicle according to the independent claims.

According to the inventive method which assists a driver of an ego-vehicle in making use of a gap between vehicles to enter a traffic flow at an intersection, a recommendation and/or warning that is perceivable for the ego-vehicle's driver is finally output, which even considers the current state and condition of the driver. The recommendation and/or warning that is given (output) to the ego-vehicle's driver is output in accordance with an assistance signal that includes information, which is adapted based on a driver's gazing behavior. The assistance signal is generated by a processor of the system, which receives inputs from different sensors. First, the environment of the ego-vehicle is physically sensed by an environment sensor or a plurality of environment sensors. In the environment, vehicles that are in the proximity of the ego-vehicle are sensed and the output of the respective environment sensor is supplied to the processor. From the data received from the environment sensor or the plurality of environment sensors, the processor can calculate a gap size between two successive vehicles in a traffic flow. Of course, the processor can also determine a plurality of gaps in a traffic flow.

Furthermore, using at least one additional, different sensor, which is called driver sensor, the ego-vehicle driver's gazing behavior is observed and the respective sensor output is fed to the processor as well. The processor analyzes the data received from the driver sensor and thereafter, taking into account the result of the analysis of the ego-vehicle driver's gazing behavior as well as the determined gap between two successive vehicles in the environment of the ego-vehicle, generates an assistance signal. This assistance signal includes information, which is the basis for outputting a recommendation to a driver of the ego-vehicle or for generating and for producing a warning for the driver of the ego-vehicle.

The system for assisting the driver furthermore comprises a memory in which parameters are stored, which are used in the processor for performing the necessary calculations. In particular, the memory may store a relation between an analysis result of the ego-vehicle driver's gazing behavior and gap sizes. This will be explained in greater detail later on with reference to a preferred embodiment.

The advantage of the inventive method, the inventive assistance system and corresponding vehicle is that any recommendation and/or warning may instantaneously adapt to the current driving capability of the ego-vehicle driver. Since the recommendation and/or warning is based on the assistance signal which is generated not only considering former behavior of the ego-vehicle driver but a current ego-vehicle driver's gazing behavior, it is possible to adapt to the current situation, especially the current status and condition of the ego-vehicle driver. Thus, if the driver is tired and therefore his reaction time to movements and behaviors of other vehicles' behavior in the environment of the ego-vehicle may be slower than usual, the recommendation of using a gap, or the warning to not use a gap is adapted. The current analysis of the driver's gazing behavior is used when determining the assistance signal with the included information for recommendations and/or warnings.

The recommendations and/or warnings that are output are much more satisfying for the ego-vehicle driver when compared to the previously known system. The inventive method will particularly recognize (determine) situations in which the ego-vehicle driver is not fully or at least not sufficiently focusing his or her attention on the traffic environment. The inventive method may then adapt the minimum gap size automatically, wherein the minimum gap size represents an example for a lower threshold for outputting a recommendation. Thus, the method avoids that the ego-vehicle driver feels overburdened when trying to follow the recommendation. The driver will receive only recommendations and/or warnings that can actually help him in that situation and he will therefore never be bothered. Thus, the acceptance for such a driver assistance system is increased which in turn leads to an improvement of the overall traffic safety.

The sub claims define advantageous details and aspects.

According to one advantageous aspect, in the step of analyzing the ego-vehicle driver's gazing behavior, a measure indicating the current driver's capability is determined.

The inventive method analyzes an ego-vehicle's driver gazing behavior in order to improve the driver assistance systems capabilities. Particularly, the analysis of the driver's gazing behavior is used to determine which gaps the driver can safely take and/or which gaps could result in a hazardous traffic situation. Therefore, for example, if the driver's gazing behavior is not adequate to a traffic situation, this may indicate that the driver's capability to judge the gaps properly is insufficient and the risk of a collision when executing a driving maneuver is high.

The observed gazing behavior may furthermore indicate a driving experience of the driver in similar traffic situations. The measure indicating the current driver's capabilities takes into account the driving experience.

The analysis of the observed gazing behavior with respect to the traffic environment may show on which vehicles in the traffic environment the driver focuses his gaze and therefore his attention. From this information, the analysis may further derive how far into the future of the possible evolvement of the current traffic environment the driver is planning. For example, the driver may focus his gaze on the next vehicle to the ego-vehicle in a driving direction and may entirely, or almost entirely, neglect a vehicle beyond the next vehicle in the driving direction. Thus, the driver may reveal in his gazing behavior how farsighted his driving behavior actually is. The analysis of the gazing behavior according to the inventive method may extract this information and thus increase quality of predictions of the driving assistance system.

The analysis of the observed gazing behavior may use a frequency of the driver turning his head and/or an angle covered by the gazing direction over time, to estimate how comprehensive a driver's perceived representation of the environment is. The gazing behavior and thereby the driver's perceived representation of the environment may be analyzed with respect to its spatial characteristics, for example, which regions of the environment does the driver observe, and/or its actuality, for example how long are time intervals between focusing on a certain aspect of the environment around the ego-vehicle.

Observing a driving behavior and in particular observing a gazing behavior of an expert driver may further improve generating suitable models for analyzing the observed driver's gazing behavior and assessing the driving capabilities of the driver.

Thus, from an analysis of a plurality of different characteristics that can be derived from the observed driver's gazing behavior, one single measure is calculated that is representative for a current overall driver performance. This overall measure can then be used in order to determine the recommendable gap size. A lower threshold for the recommendable gap size is a minimum gap size, which is consequently determined dependent on the measure that indicates the current driver's capability. When such a minimum gap size is determined in accordance with the explanations given above, this minimum gap size may be used for recommending a gap, which is generally done as known already in the art. According to one preferred aspect of the present invention, the consideration of an analysis result of the driver's gazing behavior is thus used in order to suggest only gaps to the ego-vehicle driver in an adaptive manner such that these gap will presumably be judged to be reasonable by the ego-vehicle driver. Thus, the minimum gap size is adapted not only in a static manner and in considering the current driver, but additionally the current situation and status of the driver, which inevitably will affect his gazing behavior. It is to be noted that using a single measure for the current driver capability is not necessary for determining a minimum gap size, because using a trained model will be able to directly determine such minimum gap size from the input observation data. However, generating a single measure for the driver capability is useful, when the analysis result shall be used by other assistance systems as well.

Advantageously a correspondence between the current driver's capability and the respective driver's gazing behavior is determined. This may be implemented by building a model based on theoretical considerations how the gaze behavior should be in the currently observed traffic environment and/or the predicted evolvement of the observed traffic environment. Additionally or alternatively, the model may be built based on the gaze behavior of an expert driver. The model provides a correspondence between a newly observed gazing behavior and a minimum gap size, which the ego-vehicle's driver may safely use.

Furthermore, advantageously a correspondence of a currently observed gazing behavior indicating a current driver's capability is determined based on an observation which gap sizes are (typically) used by the ego-vehicle driver. When doing so, it is generally assumed that a driver's capability corresponds to the gap size he regularly uses for entering a traffic flow. Thus, from the driver's behavior in the past it can be concluded which gaps he usually uses and from an analysis of the gap sizes and the corresponding driver's gazing behavior in the past, an estimation for the driver's driving capability can be derived. Thus, observation results can be used to establish a model that gives the correspondence between a newly observed gazing behavior and a minimum gap size, which can be safely used.

Of course, the gaps used by a driver may be classified into "safe gaps" and "unsafe gaps" for example, by analyzing the reaction of other traffic participants to the ego-vehicle entering the traffic flow. This allows to derive the competence of the driver only with respect to manoeuvers where other traffic participants are not endangered. For example, if the driver decides to enter a rather small gap which forces the succeeding vehicle to break, such a gap size will not be taken into consideration for adaptation of the minimum gap size.

Further, it is preferred that the assistance signal is generated including a warning information in case that an observed driver behavior indicates that the ego-vehicle driver is about to enter or has already started entering a gap. The assistance signal including a warning information is generated in case the gap has a determined size but the determined size does not match the determined correspondence between the driver's gazing behavior and the gap size. This prevents that the ego-vehicle driver enters a gap in the traffic flow, which is smaller than considered safe. Thus, if for example the driver misinterprets the current traffic situation and is about to enter a gap that is smaller than the driver estimated, which may sometimes be a direct consequence of a reduced concentration or tiredness, the driver can be warned by the system. Since the system observes the driver's actual behavior and is able to exploit knowledge about the relation between the ego-vehicle driver's gazing behavior, which is representative for the driver's current driving capability and the gap sizes that such a driver usually uses, the system is able to output a warning when the currently observed driver's gazing behavior and the determined gap size do not match.

There are a plurality of options to determine whether the driver is about to enter a gap between two successive vehicles. One simple way is to observe the driver's operation of the vehicle, for example operation of the throttle, steering wheel and/or brakes and so on. On the other side the intention to start entering a gap may also be determined from the observed driver's gazing behavior. For example, before the driver starts the turning manoeuver in order to enter a gap, he usually will focus on the traffic flow and moving vehicles on his left and right side. Then, after deciding to enter a spotted gap between successive vehicles, the driver usually focuses his gaze to the direction where he wants to drive. If this is determined from the observation of the driver's gazing behavior, it can be concluded that the maneuver is about to start. Furthermore, it is also possible to sense the current speed of the vehicle, which is in particular helpful in case that the driver had to stop at the intersection. Thus, if the vehicle starts moving again, it may be concluded that now a turning manoeuver has been initiated with the intent to enter the gap.

It is to be noted that the present invention is particularly useful at intersections where the driver of the ego-vehicle intends to turn left in a right-hand drive traffic system or to turn right in a left-hand drive traffic system. In such situations, the driver regularly has to be aware of a relatively high number of vehicles involved in the entire traffic situation. Thus, for such traffic situations it is very important that the ego-vehicle's driver accepts recommendations of an assistance system and therefore it is highly desirable to provide a method with tailored recommendations or warnings. Nevertheless, it is to be noted, that the current system may be applied to any assistance system estimation and consideration where the gap size is involved, e.g., turning in oncoming traffic or changing lanes. In order to easily understand the present invention, an intended turning manoeuver to the left at an intersection of a right-hand driving traffic system will be used for further explanations. It is evident, that for a left hand driving system a similar situation is a turning manoeuver to the right.

BRIEF DESCRIPTION OF THE DRAWINGS

The invention will now be explained in further detail with respect to the annexed drawings in which.

DETAILED DESCRIPTION

Figure 1:
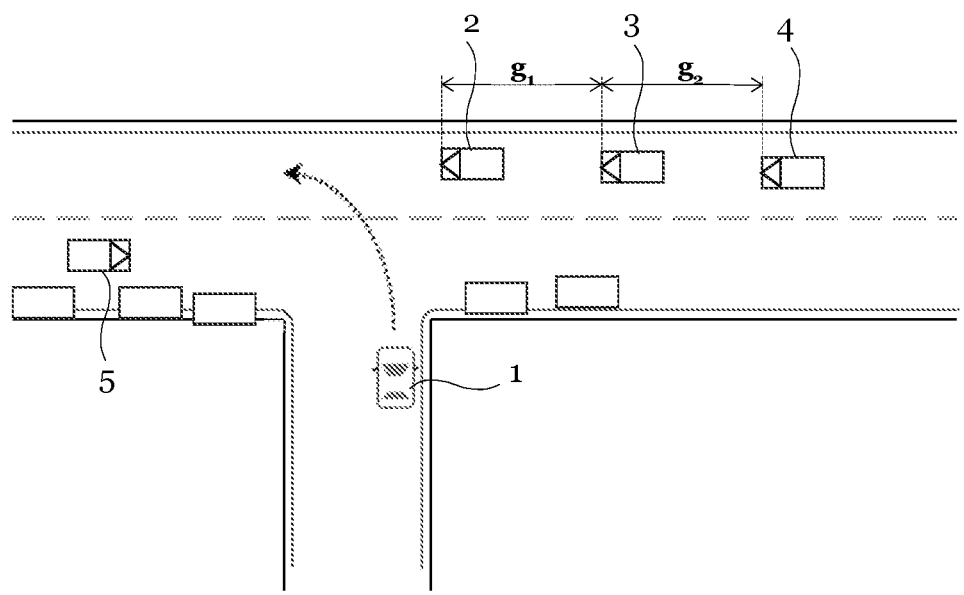
FIG. 1 shows a traffic situation in which the current invention may advantageously be applied.

In FIG. 1, a top view of an intersection is shown with a typical traffic situation in which an ego-vehicle driver intends to turn left. Of course, such a turning manoeuver can be performed safely only if a gap in the traffic flow on the target lane is sufficiently large to be entered by the ego-vehicle 1. Further, traffic on the other traffic lane may also be taken into consideration, because in the illustrated traffic situation the ego-vehicle driver needs to cross a lane with traffic from the left when he makes the turning manoeuver towards the target lane.

Apart from the ego-vehicle 1, which, in the illustrated situation, approaches the intersection and the driver of which intends to perform such left turning movement, a plurality of other vehicles can also be seen. In particular, vehicles 2, 3 and 4 are driving on the target lane and are approaching the intersection from the right side. Additionally a vehicle 5 approaches the intersection from the left side on the traffic lane, which needs to be crossed by the ego-vehicle 1. Additional vehicles can be seen that are parking on the right side of the lane to be crossed, which, of course, also affect the entire traffic situation.

It is to be noted, that all explanations are given with respect to the left turning manoeuver in a right-hand drive traffic system. All technical teachings given herein may equally be applied to other traffic situations where an estimation (recommendation, warning) is needed whether a gap in the traffic flow is sufficient for entering this particular gap with the ego-vehicle. Of course, usually such estimation and final decision is made by the ego-vehicle driver. However, as it is mentioned already in the introductory part, driver assistance systems nowadays are able to produce recommendations for gaps, which reasonably may be used by the ego-vehicle driver.

It is to be noted, that the pure determination of gaps g1, g2, which are distances between succeeding vehicles 2, 3 and 4 in a traffic flow on one lane is already known in the art. Thus, the details for such gap determination will not be explained. Only for the general understanding, it is to be noted that vehicles in the environment of the ego-vehicle 1, in the present traffic situation vehicles 2, 3, 4 and 5, are observed using sensors that are mounted on the ego-vehicle 1 and from the data thus collected, the gaps' sizes can be calculated. Some more details with respect to the system's structure will be explained with reference to FIG. 2.

In most cases, when the ego-vehicle driver intends to be assisted by the driver assistance system, he will initiate the respective function of the driver assistance system. Upon receiving a respective, for example spoken, instruction, the system will observe the environment and determine gaps which might potentially be used by the ego-vehicle driver. Of course, it is also possible that the system permanently observes the environment of the ego-vehicle but outputs recommendations and warnings or performs calculations on collected data only in case that it is asked for by the ego-vehicle driver. This is the first step to avoid that the ego-vehicle driver is annoyed by the system because it always outputs some information to the driver although the driver already fully observed every aspect of the current traffic situation himself.

As it is shown in FIG. 1, a recommendation of the gap may not only be dependent on the gap size in the traffic flow from the right side, but also dependent on the traffic situation on the traffic lane, which is to be crossed by the ego-vehicle 1. Thus, measures in order to avoid false recommendations of assistance systems may also be applied to the present invention. In the present case for example the system might suppress outputting a gap recommendation of gap g1 in case that there is a coincidence in time between the gap g1 approaching from the right side with vehicle 5 approaching from the left side. Thus, only gaps, which in fact may safely be used by the ego-vehicle driver may be recommended. In the illustrated situation, this may be gap g2, which is also sufficiently large but can be entered after vehicle 5 passed.

Figure 2:
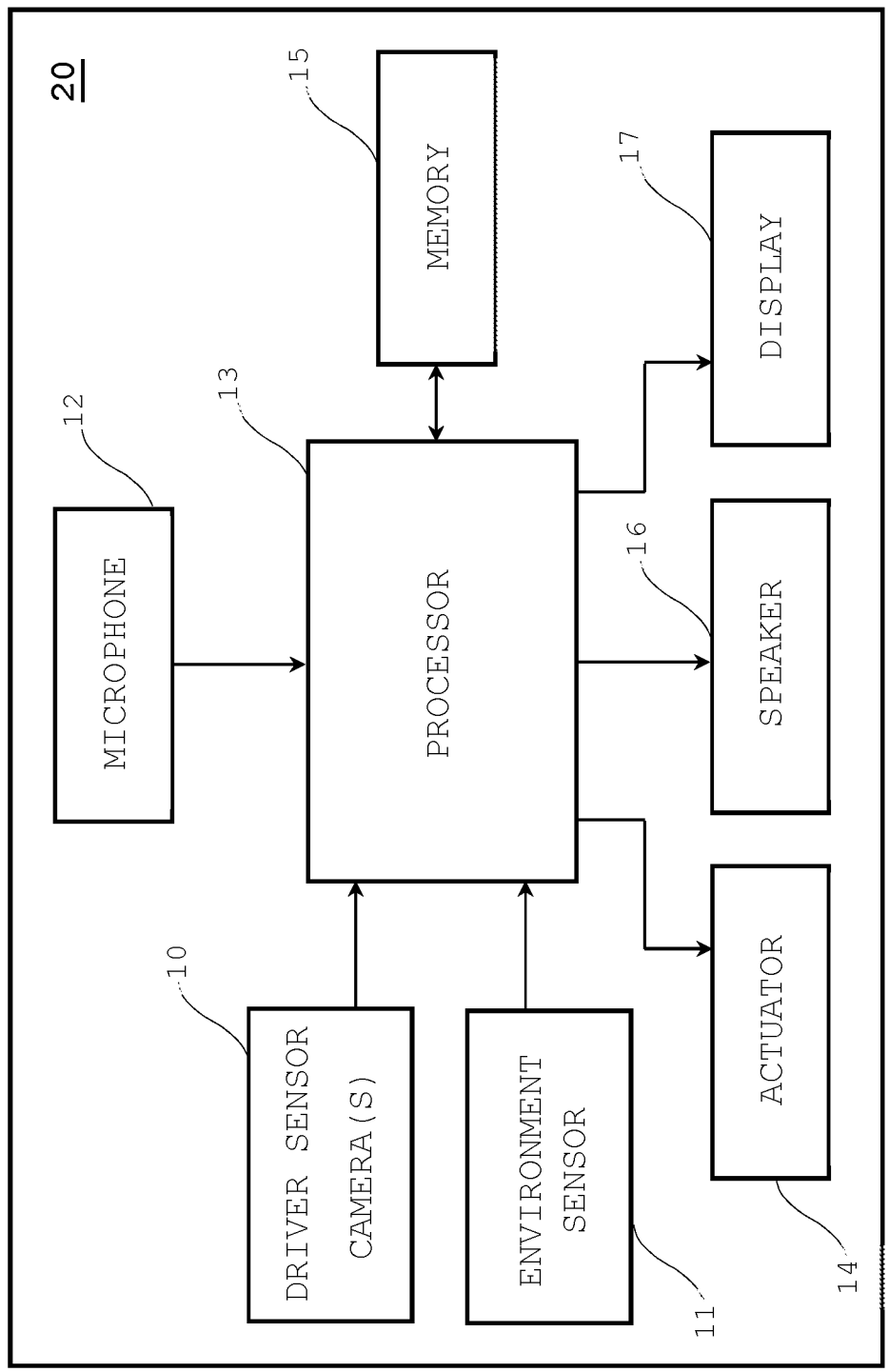
FIG. 2 shows a schematic illustrating the layout of the driver assistance system.

FIG. 2 is a schematic illustrating the main components of the current assistance system 20. This assistance system 20 as shown in FIG. 2 is entirely included in the ego-vehicle 1. Of course, additional assistance functionality, which goes even beyond the currently presented assistance system 20 may also be included in the described ego-vehicle 1. It is furthermore perfectly clear, that the information that is determined with respect to the present invention may also be used in these additional driver assistance systems. Further, the algorithms and calculations that need to be performed and executed with respect to other driving assistance functions may be altogether calculated or executed in the same processor or in a plurality of individual processors, which can be connected to each other in order to exchange data (information). Of course, generally, the different processors may all be connected to one or a plurality of different memories so that an indirect exchange of data is ensured. This is in particular important in case that information has to be available for later use in another part of the entire traffic assistance system.

Coming back to the structure as shown in FIG. 2, at first, the driver assistance system 20 comprises at least one driver sensor 10. Such driver sensor 10 may particularly be a camera, which is directed to the ego-vehicle driver so that a gazing behavior of the ego-vehicle driver can be observed. The data produced by the driver sensor 10 is transferred to a processor 13, which analyzes the received information and executes any calculation, which is explained hereinafter unless mentioned otherwise. An analysis of the driver's gazing behavior may concern duration and focus of the ego-vehicle driver's gaze. It is of course possible to associate the information with aspects of the currently encountered traffic situation or the specific elements of the current traffic situation. For example, the focus of ego-vehicle driver's gaze may be associated with a certain vehicle 5 approaching from the left side in the example illustrated in FIG. 1. Further, a dependency of the ego-vehicle driver's gazing behavior to distances and speed of the vehicles in the environment of the ego-vehicle may also be analyzed.

The result of this analysis is used, as described later on, in order to determine whether a gap, which is determined in a traffic flow, is appropriate to be entered by the ego-vehicle 1. The correspondence between gap sizes and a driver's gazing behavior is defined in a trained model. Training of the model can initially be performed in the design phase of the system. Additionally or alternatively, the model can be improved continuously online based on the observed driver behavior. Only online training of the model without using the pre-trained model is also possible.

The schematic of FIG. 2 mentions only one driver sensor 10. This single sensor 10 is representative even for a plurality of driver sensors. The driver sensor 10 may, apart from observing the gazing behavior of the ego-vehicle driver, also deliver information on driving actions that are taken by the ego-vehicle driver. Thus, even sensors that observe operation of the throttle, steering wheel, brakes and the like may be interpreted as driver sensors, since they allow to determine the current driving behavior or an intended driving behavior. Such intended driving behavior could for example be the start of a movement after the ego-vehicle 1 stopped at the intersection as shown in FIG. 1. Here, change of the value measured by the throttle sensor may be an indication that the driver is about to start accelerating, because he intends to enter a gap g1, g2 he spotted in the traffic flow approaching from the right side.

In addition to an observation of the ego-vehicle driver's gazing behavior it is of course necessary to observe the environment of the ego-vehicle 1, in order to produce sensor data that allows determination of gaps g1, g2 between vehicles 2, 3, 4 driving in the traffic flow. Therefore, the ego-vehicle 1 furthermore comprises environment sensors 11. Again, only one environment sensor 11 is mentioned in the schematic of FIG. 2, but the system 20 may use a plurality of environment sensors, which are represented by the single sensor 11. Furthermore, it is to be noted that each of the mentioned sensors, the driver sensor 10 or the environment sensor 11, may be exclusively dedicated to the current driver assistance system 20 or may share their outputs with other driver assistance systems.

In addition to information that is received from the driver sensor 10, the processor 13 also analyzes the data, which is received from the environment sensor 11, which is also connected to the processor 13. From the information received from the environment sensor 11, the processor 13 calculates gap sizes between succeeding vehicles 2, 3, 4. The analysis results of the ego-vehicle driver's gazing behavior, determined from the output of the driver sensor 10, and also the size of the determined gaps g1, g2, calculated from the data received from the environment sensor 11, are then evaluated and an assistance signal is generated by the processor 13.

Such assistance signal, generated by processor 13, is then output to an actuator 14 and/or a speaker 16 and/or a display 17. The actuator 14, speaker 16 and display 17 are used as an interface in order to finally output a recommendation and/or warning to the ego-vehicle driver in a manner, which is easily perceivable for the ego-vehicle driver. The recommendation and/or warning will be explained later with respect to a plurality of examples and outputs in accordance with information included in the assistance signal.

A practical way to output information to an ego-vehicle driver is display 17, which can either be for example a TFT display but also a head up display in order to further improve comfort for the ego-vehicle driver.

Alternatively or additionally, the information conveying the recommendation and/or warning may be output acoustically, preferably using a speech output via the at least one speaker 16.

Of course, it might be necessary that some information is stored for later use or that in the first place information needs to be collected before processing by processor 13 starts. Thus, the system 20 also comprises a memory 15, where algorithms used for calculating gaps g1, g2 between vehicles 2, 3, 4 and models for evaluating the ego-vehicle driver's behavior are stored. As mentioned above already, the memory 15 may either be a single memory, which is used by a plurality of different processors or maybe a memory 15 consisting of a plurality of different memories distributed over the ego-vehicle 1 and different systems.

In case that initiation of the functionality to recommend a gap g1, g2 in the traffic flow shall be performed by the ego-vehicle driver using a spoken instruction, the system 20 furthermore comprises a microphone 12. Again, microphones 12 that are already available in the ego-vehicle 1, for example for communication systems installed in the ego-vehicle 1, may also be used for instructing the system 20 to analyze the current traffic scene and to recommend a gap g1, g2.

Figure 3:
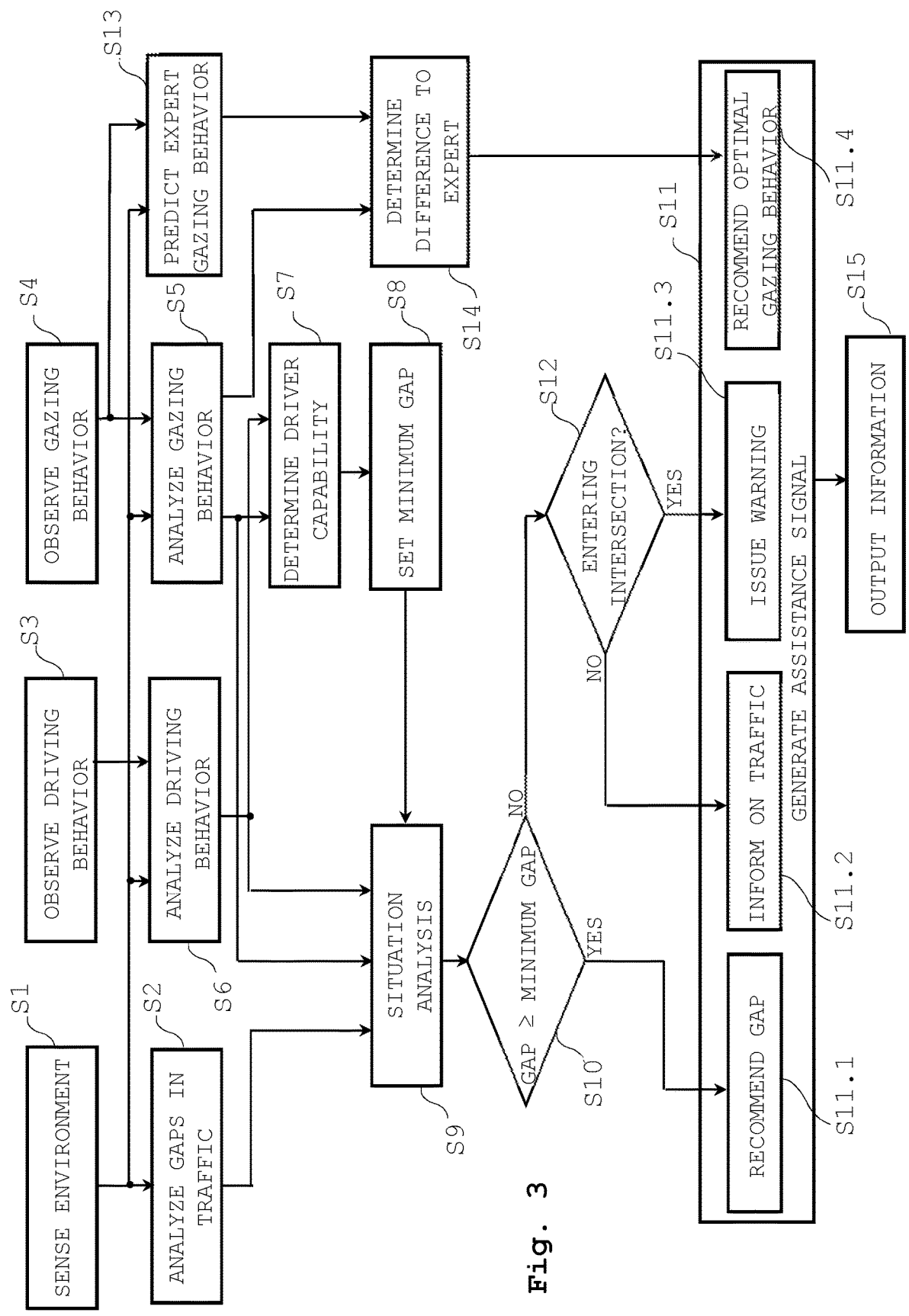
FIG. 3 shows a simplified flowchart for explaining the major method steps of the present invention.

Now, further aspects of the present invention will be explained in greater detail with respect to the flowchart as illustrated in FIG. 3. The system 20 itself, which is used to execute the different method steps corresponds to the system 20 explained with reference to FIG. 2.

At first and not explicitly shown in the drawing, the system 20 needs to learn relations between a gazing behavior of the ego-vehicle driver and corresponding gap sizes and/or different levels of driver's capability. In order to be able to determine from a certain observed ego-vehicle driver's gazing behavior the current driving capability, a model stored in the memory 15 is trained. After the training phase, an observed gazing behavior can be mapped to a certain level of expertise which finally corresponds to a minimum gap size. This learned mapping will then be used during a later phase in order to determine a certain level of driving capability of even an unknown driver after his gazing behavior has been observed. Thus, the driver will only approach an intersection as shown in FIG. 1 and the system will automatically determine the driving capability of the driver in the current traffic situation from the observed gazing behavior. Such a training of systems is generally known in the art and different machine learning methods can be applied. Examples are LSTM, SVM, random forest, multinomial regression, and others.

Additionally and alternatively, the system 20 may combine information on a driving behavior of the ego-vehicle's driver in the past and an analysis of the observed gaze behavior in order to achieve a reliable estimate for the driving capability of the driver in the current traffic situation.

Thus, fewer observations on the ego-vehicle's driver in the past are required.

Different levels of driver capability as mentioned above can be determined by observing a driver gazing behavior and evaluating the observed behavior relative to the corresponding situation.

The system 20 may for example determine based on the analyzed gazing behavior if the gazing behavior of the ego-vehicle driver is adequate for the current driving situation, and if the vehicle control exercised by the ego-vehicle's driver is adequate, too. Then, the system 20 can conclude that the driver has high skill and may generate an assistance signal including recommendations and/or warnings, which recommend or allow the driver to use small gaps g1, g2. The other traffic participants, for example vehicles 2, 3, 4, 5, will not be interfered by the ego-vehicle 1 using small gaps g1, g2 when the ego-vehicle 1 is controlled with high driving skill.

The system 20 may determine the driving skill of the ego-vehicle's driver in at least one of different procedures.

Preferably, the system 20 may determine a measure for the driving skill by observing driving behavior of the ego-vehicle driver based on sensor data from the driver sensor 10 and further taking into account effects of the driving behavior on a further evolvement of the traffic situation analyzed based on data acquired by the environment sensor 11.

For example, if observed control actions of the ego-vehicle driver regularly require other vehicles 2, 3, 4 to adapt their behavior in order to avoid a collision or risky situation, the system 20 may assess the driving skill of the ego-vehicle's driver as low. On the other hand, the system 20 may judge the driving skill of the ego-vehicle's driver as high or advanced, if the ego-vehicle 1 uses gaps g1, g2 with small gap sizes without requiring the other vehicles 2, 3, 4, 5 to decelerate due to the ego-vehicle 1 entering the intersection in FIG. 1.

Additionally or alternatively, the system 20 may determine the measure for the driving skill by observing the gazing behavior and analyzing the gazing behavior with respect to the observed traffic environment. If the analyzed gazing behavior reveals that the ego-vehicle driver monitors the crucial aspects of the traffic environment and focuses his attention to the specific elements of the traffic environment with high effect of the further evolvement of the traffic scene, a highly skilled gazing behavior is determined. The system may determine that a skilled gazing behavior taking account of key elements of the traffic scene translates to a highly skilled vehicle control corresponding to an expert driver. Thus, the measure for the driving skill is set accordingly.

Alternatively, it could be assumed that the driving capability is the higher the smaller the gap g1, g2, is which is used by the driver, without negatively impacting the safety of other traffic participants. In order to ensure that only situations are considered where other traffic participants are not endangered by the ego-vehicle driver, consideration of gap sizes is suppressed where the driving manoeuver (e.g. left turning movement) causes other traffic participants to react by breaking, for example.

Further, according to another aspect of the invention, a model is learned which predicts the gazing behavior of an expert driver based on the currently observed traffic scene. Here, the driver's gazing behavior is only considered for building the model in those cases, where it is ensured that the driver has (very) high driving capabilities. Thus, if a specific traffic situation is determined based on the environment sensors, the optimal theoretical driver's gazing behavior of the virtual expert driver can be determined from the model of the expert driver.

Coming now to FIG. 3, the different method steps in order to assist the driver in entering a gap between successive vehicles 2, 3, 4 will be explained.

At first and as indicated with step S1, the environment of the ego-vehicle 1 is sensed. The output of the sensor 10 are fed to the processor 13. In the processor 13, the output of the sensors 10 is analyzed.

The output of the sensor 10 enables the processor 13 to analyze the environment of the ego-vehicle 1 and to generate a representation of the traffic situation (traffic scene) based on the sensed environment. The assistance system 20 may predict the further evolvement of the current traffic scene and generate recommendation(s) and/or warning(s) based on the sensor data on the environment. The processor 13 may determine the gaps g1, g2 based on the generated representation of the traffic situation.

In particular, the processor 13 analyzes the traffic to determine a gap or even a plurality of gaps g1, g2 between successive vehicles 2, 3, 4 in the traffic in step S2. In addition to observing the environment of the ego-vehicle 1 in step S1, the driver of the ego-vehicle 1 is observed in step S3. By using the driver sensor 10, the gazing behavior of the driver is observed in step S4.

The observed driving behavior and the representation of the sensed environment forms a basis for analyzing the driver's behavior in step S6. The representation of the traffic is also used in step S3 for observing the driving behavior and in step S4 for observing the gazing behavior.

The driver sensor 10 may be a camera. The information that is output from the driver sensor 10 is also supplied to the processor 13 which in step S5 analyzes the observed driver's gazing behavior.

As mentioned above, the system 20 is trained to map an observed gazing behavior together with a current traffic situation to a certain level of driving capability, for example a measure for the driving capability using a model. This is, as shown in FIG. 3, performed in step S7 in which a driver capability of the ego-vehicle's driver is determined. The respective model is stored in the memory 15. Based on the model, a minimum gap size may directly be determined.

In the illustrated embodiment, an intermediate step S7 is executed. Here, based on the model, a measure for the current driving capability is determined. It is to be noted that determining a measure for the current driver capability may include all the different aspects, which are analyzed from the observed gazing behavior, including a general driving competence. But because the current driving capability may be influenced by some boundary conditions of the present traffic situation and also because of the current state of the driver (tiredness, stress, attentiveness, cognitive load), it is an advantage when the measure reflects these influences as well. This is automatically the case, because the overall measure is always determined based on the current driver's gazing behavior, which is always influenced by the driver's state.

Having knowledge about the current driver capability determined in step S7, the minimum gap size that may be used for the ego-vehicle driver, is set in step S8. The easiest way to define the minimum gap size when the measure is determined, is to store a table in memory 15 which associates gap sizes with the determined measure for current driver capability. Of course, other measures may be taken to define the relation between the determined measure of the driver capability and a minimum gap size.

In step S9, the processor 13 performs an analysis of the situation. In particular, the current traffic situation is analyzed based on the analyzed gaps in the traffic from step S2, the analyzed driving behavior of the ego-vehicle's driver from step S6 and the analyzed gazing behavior from step S5.

The processor 13 performs the analysis of the situation at regular intervals with a high repetition rate. The repetition rate may be around 10 updates per second for a preferred embodiment.

In the following step S10, it is determined whether a determined gap size between successive vehicles 2, 3, 4 in the traffic flow exceeds the set minimum gap size from step S8. If the determined gap size is larger than the set minimum gap size, it is concluded that the ego-vehicle driver might safely start his turning manoeuver and enter the respective gap g1, g2. The step of generating an assistance signal thus will comprise generating the assistance signal recommending the respective gap g1, g2 in step S11.1.

Thus, a gap recommendation as indicated in step S11.1 can be output by the system 20 in step S152, using one of the different output channels, like the actuator 14, the speaker 16 or the display 17.

Of course, the system 20 will also be able to output information if a current gap g1, g2 is not sufficient and, furthermore, give indications on possibly suitable gaps g1, g2 in the near future, for example, after the currently approaching vehicle.

If in step S10 the processor 13 determines that an actual gap from the analyzed gaps g1, g2 in step S2 and according to the situation analysis of step S9 is smaller ("NO") than a minimum gap size set in step S8, the method proceeds to step S12.

In step S12, it is determined if the ego-vehicle 1 enters the intersection. If the ego-vehicle 1 indeed enters the intersection ("YES" in step S12), although the determined gap size is below a set minimum gap size, the method proceeds to step S11 to generate an appropriate assistance signal. In this case, the appropriate assistance signal may in particular include issuing a warning in step S11.3.

If the ego-vehicle 1 does not enter the intersection ("NO" in step S12) after having determined that the gap size is below a set minimum gap size, the method proceeds to step S11 to generate an appropriate assistance signal. In this case, generating the assistance signal may include information on the traffic in step S11.2, comprising for example information on a suitable future gap from the traffic analysis in step S9.

Generating the assistance signal may be suppressed, as the ego-vehicle's driver is determined to be an expert driver in step S14.

It is to be noted that the situation analysis is repeated at a rate of, for example, 10 Hz so that in response to any change in the situation, the generated signal is adapted so fast that the user will not recognize any delay.

As mentioned above already, there is a plurality of possible different ways of outputting the information. For example, an output might be based on speech, on visual hints in the driver's field of view indicating where he or she should look or other modalities, e.g. tactile feedback, or any combination of the different ways.

Apart from recommending specific gaps g1, g2 and thereby giving concrete hints to the driver about a recommended driving behavior, it is also possible that the system 20 is more directed to observing whether the current driving actions taken by the ego-vehicle's driver are reasonable.

In that case, the system observes the ego-vehicle's driver in step S3. In the subsequent step S6, the observed driver behavior and his vehicle operation is analyzed in order to determine whether he intends to start the respective driving behavior (in the present case, starting a movement towards entering the gap g1, g2 or showing a gazing behavior, which is indicative of the intention to starting the movement) or whether he has already started the respective driving action in the situation analysis of step S9.

Then, if it is determined that the driver is about to start or has already started the driving manoeuver in step S9, the determined gap g1, g2 in the traffic flow is compared to the minimum gap size that would correspond to the determined measure for the current driver capability. This comparison is executed in step S10.

If it is concluded in step S10, that the determined gap size of step S2 is sufficient and thus corresponds to the determined current driver capability, no further action is taken. On the other hand, if the determined gap size, for which it is assumed that it will be entered by the driver, because he is about to or has already started the respective driving manoeuver as determined in step S12, is not sufficiently large, a warning will be generated and issued, as indicated by the information of step S11.3.

Furthermore, and as indicated above already, when the system 20 is set up, the model is also trained. In step S13, an optimal gazing behavior (expert gazing behavior) based on an observed traffic situation is predicted. The optimal gazing behavior is the estimated gazing behavior of an assumed driver with perfect driving capability. Thus, the system is trained to model a driver's gazing behavior of a virtual expert driver, given a specific traffic situation. Thus, based on an analysis of the ego-vehicle driver's gazing behavior from step S5, and based on the optimal gazing behavior predicted in step S13, a difference between the driver's gazing behavior and the modeled driver gazing behavior (expert gazing behavior) is determined in step S14. Information about the determined difference is then included as an information in the generated assistance signal of step S11 so that information on a recommendation for a driver's gaze as indicated in step S11.4 is included in the assistance signal. It is to be noted, that such information may be directed only to certain aspects of the gazing behavior, like for example the focus of the eye direction of the driver, the frequency of changing between a gaze direction to the right and a gaze direction to the left, or the like. Further, before such a recommendation as indicated in step S11.4 is given, it might also be taken into consideration, whether the difference between the overall performance of the current ego-vehicle driver and the modelled gazing behavior of the virtual expert driver exceeds a certain threshold. Thus, if the current ego-vehicle's driver already achieved a high level of competence in driving the vehicle, it can be avoided that such driver is unnecessarily disturbed by outputting some recommendations only because of a non-identical gazing behavior.

Finally, as indicated in step S15, the information is output, for example displayed, to the ego-vehicle driver.

To sum up, for the present invention a determination of gaps g1, g2 between successive vehicles in the traffic flow is taken into consideration together with a driver's gazing behavior, which is an indication of the driving competence, already being influenced by the current situation and driver's state. Thus, concluding from an observed driver's gazing behavior to his current driving capability using a pre-trained model, allows to adapt recommendations and/or warnings not only with respect to one individual driver but even situation-dependently. This gives a great advantage over the currently known systems and will therefore lead to an improved acceptance of the driving assistance system by the ego-vehicle driver. As already stated in the introductory part, such improved acceptance will finally result in an improved traffic safety. Furthermore, the gazing behavior of the actual ego-vehicle driver may even be improved to more closely resemble an optimal gazing behavior of the expert driver.

The invention claimed is:

1. A method for assisting a driver of an ego-vehicle in making use of a gap between vehicles to enter a traffic flow at an intersection, comprising the following method steps:
   physically sensing other vehicles in the environment of the ego-vehicle using at least one environment sensor mounted on the ego-vehicle;
   calculating in a processor a gap size of at least one gap between two successive vehicles based on the sensor's/sensors' output;
   observing an ego-vehicle driver's gazing behavior using at least one driver sensor mounted on the ego-vehicle;
   analyzing the ego-vehicle driver's gazing behavior;
   generating an assistance signal based on the result of the analysis and the determined size of the at least one gap; and
   outputting a recommendation or warning perceivable for the ego-vehicle's driver in accordance with the assistance signal,
   wherein the step of analyzing the ego-vehicle driver's gazing behavior comprises determining a measure indicating a current driver's capability,
   wherein information on a driver's current gazing behavior, a driver's past gazing behavior and past driving behavior are combined to determine a correspondence to the current driver's capability, and
   wherein the driver's past driving behavior is determined based on an observation which gap sizes are used by the ego-vehicle's driver in the past to enter a traffic flow at an intersection without endangering or impeding other traffic participants.

2. The method according to claim 1, wherein
a minimum gap size being a lower threshold for recommending a gap to the ego-vehicle's driver is set dependent on the analysis of the driver's gazing behavior indicating a current driver's capability.

3. The method according to claim 2, wherein
the assistance signal includes information indicating a gap to be used by the driver when the determined gap size exceeds the minimum gap size.

4. The method according to claim 1, wherein
a correspondence between the current driver's capability and the respective driver's gazing behavior is determined.

5. The method according to claim 1, wherein
the assistance signal is generated including a warning information in case that an observed driver behavior indicates that the ego-vehicle's driver is about to enter or has already started entering a gap with a determined size which does not match to the analyzed driver's gazing behavior indicating the current driver's capability according to the determined correspondence.

6. The method according to claim 1, wherein
the ego-vehicle driver's gazing behavior is compared to a modelled driver's gazing behavior of a virtual expert driver and based on a comparison result the assistance signal is generated including information for guiding the ego-vehicle's driver's gaze.

7. The method according to claim 6, wherein
information for guiding the ego-vehicle's driver's gaze is included in the assistance signal only when a difference between the determined driver's capability and a theoretical driver's capability corresponding to the modelled driver's gazing behavior of the virtual expert driver exceeds a pre-set threshold.

8. Driver assistance system comprising
a memory connected to a processor,
at least one environment sensor, and
one driver sensor which are connected to the processor,
wherein the processor is configured to determine a gap size based on the environment sensor's output, to analyze a driver's gazing behavior based on the driver sensor's output and to generate an assistance signal based on a result of the analysis and the determined gap size, wherein analyzing the ego-vehicle driver's gazing behavior comprises determining a measure indicating a current driver's capability, and
an outputting device for outputting a driver perceivable recommendation or warning according to the assistance signal, and
wherein the processor is configured to combine information from a current driver's gazing behavior, a driver's past gazing behavior and past driving behavior to determine a correspondence to the current driver's capability, wherein the processor is further configured to determine the driver's past driving behavior based on an observation which gap sizes are used by the ego-vehicle's driver, and configured to determine the driver's past driving behavior based on an observation which gap sizes are used by the ego-vehicle's driver in the past to enter a traffic flow at an intersection without endangering or impeding other traffic participants.

9. Vehicle equipped with a driver assistance system according to claim 8.

* * * * *